(12) United States Patent
Hasegawa et al.

(10) Patent No.: US 10,511,701 B2
(45) Date of Patent: Dec. 17, 2019

(54) INFORMATION PROCESSING APPARATUS, AND CONTROL METHOD AND CONTROL PROGRAM THEREOF

(71) Applicant: NEC Corporation, Tokyo (JP)

(72) Inventors: Hideo Hasegawa, Tokyo (JP); Kazuko Murakoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/511,000

(22) PCT Filed: Aug. 27, 2015

(86) PCT No.: PCT/JP2015/074173
§ 371 (c)(1),
(2) Date: Mar. 13, 2017

(87) PCT Pub. No.: WO2016/043008
PCT Pub. Date: Mar. 24, 2016

(65) Prior Publication Data
US 2017/0310808 A1 Oct. 26, 2017

(30) Foreign Application Priority Data
Sep. 16, 2014 (JP) .................... 2014-188301

(51) Int. Cl.
*H04M 1/725* (2006.01)
*G06F 3/14* (2006.01)
(Continued)

(52) U.S. Cl.
CPC .......... *H04M 1/72522* (2013.01); *G06F 3/14* (2013.01); *G09G 5/14* (2013.01);
(Continued)

(58) Field of Classification Search
None
See application file for complete search history.

(56) References Cited

U.S. PATENT DOCUMENTS

2007/0010292 A1\* 1/2007 Vetelainen .............. H04M 1/57
455/566
2010/0088634 A1 4/2010 Tsuruta et al.
(Continued)

FOREIGN PATENT DOCUMENTS

| CN | 103631493 A | 3/2014 |
|---|---|---|
| CN | 104077097 A | 10/2014 |

(Continued)

OTHER PUBLICATIONS

Internarnational Search Report, corresponding to PCT/JP2015/074173, dated Oct. 6, 2015, 2 pages.
(Continued)

*Primary Examiner* — Ernest G Tacsik
(74) *Attorney, Agent, or Firm* — Wilmer Cutler Pickering Hale and Dorr LLP

(57) ABSTRACT

There is provided an information processing apparatus for providing, at the time of occurrence of a predetermined event, screen display which is easier to see. The apparatus includes a display unit that arranges a first display frame and a second display frame side by side on a screen, displays, in the first display frame, information generated by a first application, and displays, in the second display frame, information generated by a second application, and a display controller that automatically changes, if the first application is an application for accepting an event, a size of the first display frame at the time of acceptance of the event.

7 Claims, 14 Drawing Sheets

(51) Int. Cl.
*G09G 5/14* (2006.01)
*G06F 3/0484* (2013.01)

(52) U.S. Cl.
CPC ..... *H04M 1/72519* (2013.01); *G06F 3/04845* (2013.01); *G06F 2203/04803* (2013.01); *G09G 2340/0414* (2013.01); *G09G 2340/0421* (2013.01); *G09G 2370/20* (2013.01)

(56) References Cited

U.S. PATENT DOCUMENTS

| | | | |
|---|---|---|---|
| 2010/0138767 | A1 | 6/2010 | Wang et al. |
| 2010/0289760 | A1* | 11/2010 | Jonoshita ............... G06F 1/1626 345/173 |
| 2014/0184723 | A1* | 7/2014 | Morrison ............... H04N 7/147 348/14.07 |
| 2014/0292816 | A1 | 10/2014 | Shigemasa et al. |
| 2015/0017956 | A1* | 1/2015 | Jeong ..................... H04M 1/57 455/414.1 |

FOREIGN PATENT DOCUMENTS

| | | |
|---|---|---|
| JP | 05-046341 A | 2/1993 |
| JP | 2008-305242 A | 12/2008 |
| JP | 2010-161493 A | 7/2010 |
| WO | WO-2008/090902 A1 | 7/2008 |

OTHER PUBLICATIONS

Chinese Office Action with English translation dated Jan. 16, 2019 received in related Chinese Patent Application No. 201580049861.1 (18 pages).

* cited by examiner

INFORMATION PROCESSING APPARATUS, AND CONTROL METHOD AND CONTROL PROGRAM THEREOF

CROSS-REFERENCE TO RELATED APPLICATIONS

The present application is a national stage application of International Application No. PCT/JP2015/074173 entitled "Information Processing Device, and Control Method and Control Program Thereof," filed on Aug. 27, 2015, which claims the benefit of priority from Japanese Patent Application No. 2014-188301, filed on Sep. 16, 2014, the disclosures of which are incorporated herein in their entirety by reference thereto.

TECHNICAL FIELD

The present invention relates to an information processing apparatus, and a control method and control program thereof.

BACKGROUND ART

In the above technical field, patent literature 1 discloses a technique of changing the display range of a display screen divided into two parts (see paragraph [0358]).

CITATION LIST

Patent Literature

Patent literature 1: International Publication No. 2008/090902

SUMMARY OF THE INVENTION

Technical Problem

However, the technique described in the above literature only changes the display range by waiting for a user operation, and cannot provide, at the time of occurrence of a predetermined event, screen display which is easier to see, thereby impairing the usability.

The present invention enables to provide a technique of solving the above-described problem.

Solution to Problem

One aspect of the present invention provides an apparatus comprising:

a display unit that arranges a first display frame and a second display frame side by side on a screen, displays, in the first display frame, information generated by a first application, and displays, in the second display frame, information generated by a second application; and a display controller that automatically changes, if the first application is an application for accepting an event, a size of the first display frame at the time of acceptance of the event.

Another aspect of the present invention provides a control method of an information processing apparatus including a display unit that arranges a first display frame and a second display frame side by side on a screen, displays, in the first display frame, information generated by a first application, and displays, in the second display frame, information generated by a second application, the method comprising:

automatically changing, if the first application is an application for accepting an event, a size of the first display frame at the time of acceptance of the event.

Still other aspect of the present invention provides a control program of an information processing apparatus including a display unit that arranges a first display frame and a second display frame side by side on a screen, displays, in the first display frame, information generated by a first application, and displays, in the second display frame, information generated by a second application, for causing a computer to execute a method, comprising:

automatically changing, if the first application is an application for accepting an event, a size of the first display frame at the time of acceptance of the event.

Advantageous Effects of Invention

According to the present invention, it is possible to provide, at the time of occurrence of a predetermined event, screen display which is easier to see.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
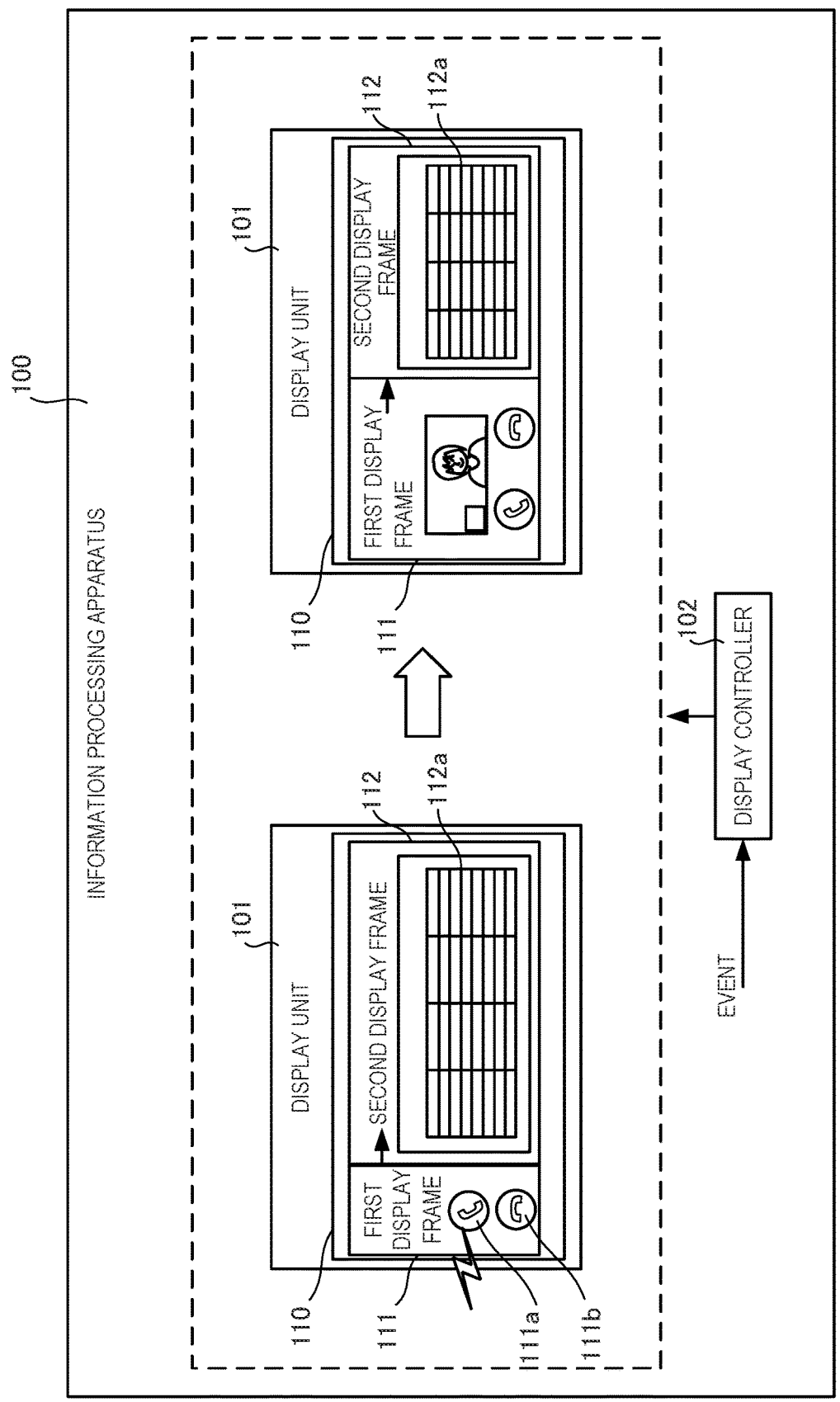
FIG. 1 is a block diagram showing the arrangement of an information processing apparatus according to the first embodiment of the present invention.

An information processing apparatus 100 according to the first embodiment of the present invention will be described with reference to FIG. 1. As shown in FIG. 1, the information processing apparatus 100 includes a display unit 101 and a display controller 102.

The display unit 101 arranges a first display frame 111 and a second display frame 112 side by side on a screen 110, and displays, in the first display frame 111, information (in FIG. 1, exemplary icons 111a and 111b) generated by the first application. The display unit 101 also displays, in the second display frame 112, information (in FIG. 1, a spreadsheet 112a) generated by the second application.

On the other hand, if the first application is an application for accepting an event, the display controller 102 automatically changes the size of the first display frame 111 at the time of acceptance of the event.

This allows the user to immediately grasp acceptance of the event.

Second Embodiment

Figure 2A:
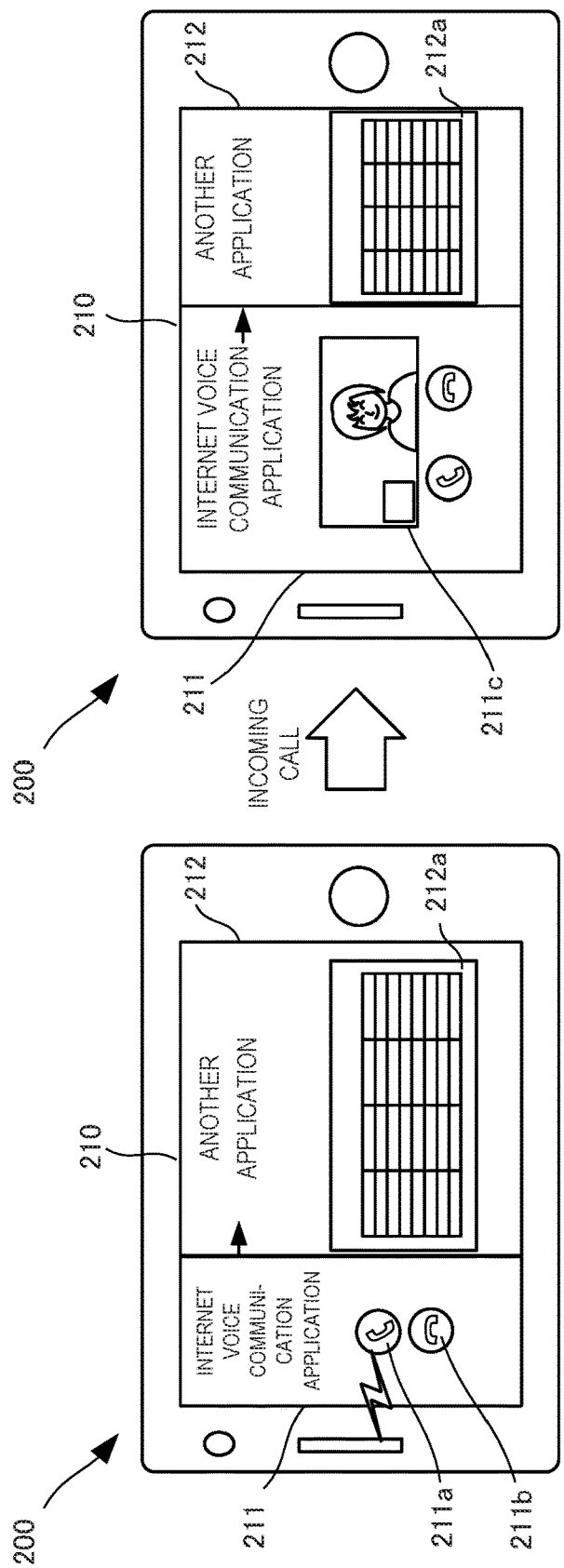
FIG. 2A is a view showing a display example by an information processing apparatus according to the second embodiment of the present invention.
Figure 2B:
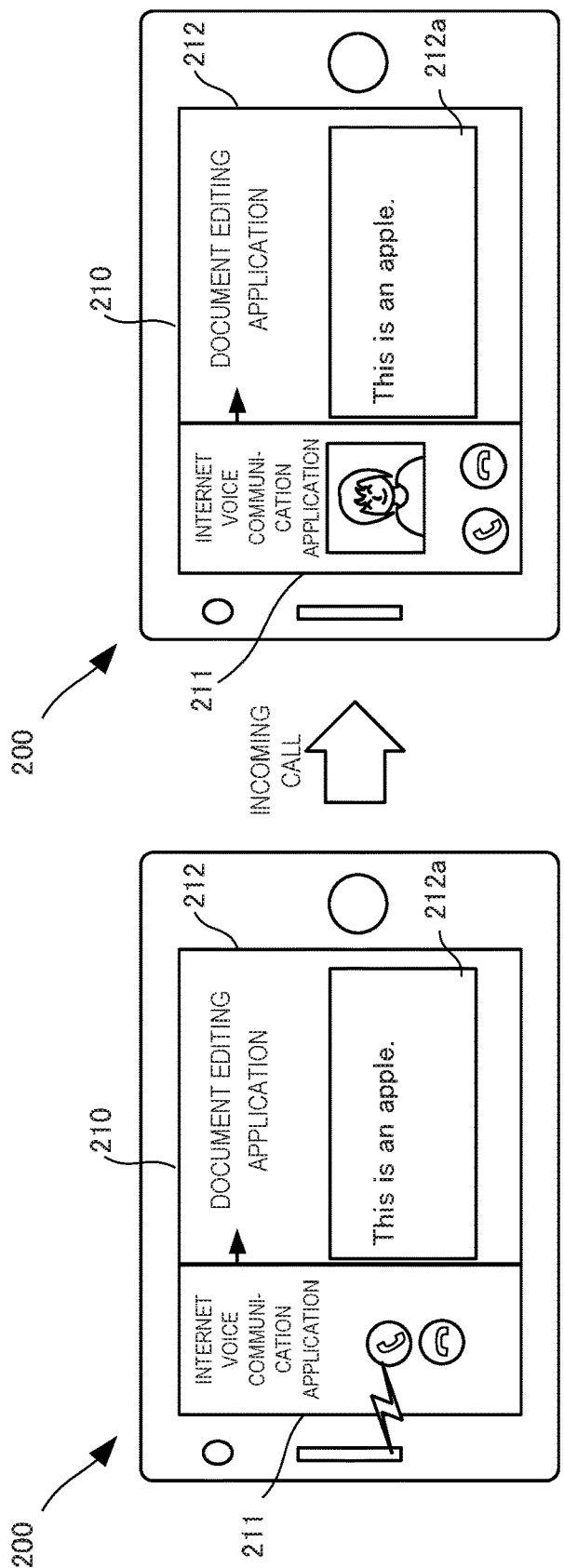
FIG. 2B is a view showing another display example by the information processing apparatus according to the second embodiment of the present invention.

An information processing apparatus according to the second embodiment of the present invention will be described next with reference to FIG. 2A and subsequent drawings. FIGS. 2A and 2B are views for explaining screen transition of an information processing apparatus 200 according to this embodiment. The information processing apparatus 200 is an apparatus with which a display screen is integrally formed, such as a smartphone or smart device.

As shown in FIG. 2A, the information processing apparatus 200 can display display frames 211 and 212 side by side on a screen 210. Images generated by different applications can be simultaneously displayed in the display frames 211 and 212. As an example, icons 211a and 211b generated by an Internet voice communication application are displayed in the display frame 211. Furthermore, a table 212a generated by a spreadsheet application is displayed in the second display frame 212.

In this state, if an event (for example, an incoming call) for the Internet voice communication application is externally accepted, the information processing apparatus 200 automatically changes the ratio between the display sizes of the display frames 211 and 212. More specifically, the information processing apparatus 200 increases the width of the display frame 211 and reduces the width of the display frame 212, as compared with those before acceptance of the incoming call event. This eliminates the need to enlarge the display frame 211 by a manual operation after the incoming call, thereby making it possible to improve the usability of the Internet voice communication application. Note that the Internet voice communication application will be described as an example of an application for externally accepting an event. The present invention, however, is not limited to this. For example, any application capable of performing voice communication or transmission/reception of mail or a message may be used.

On the other hand, as shown in FIG. 2B, if the Internet voice communication application and a document editing application are simultaneously displayed, the document editing application is preferentially displayed over the Internet voice communication application. That is, even if an event such as an incoming call occurs, an image after the incoming call is displayed in the display frame 211 having the unchanged size without changing the display ratio between the display frames 211 and 212. That is, even if an event such as an incoming call occurs, if the other application is more important, the display size is not automatically changed. This can continue an operation such as a document editing operation without any problem.

Figure 3A:
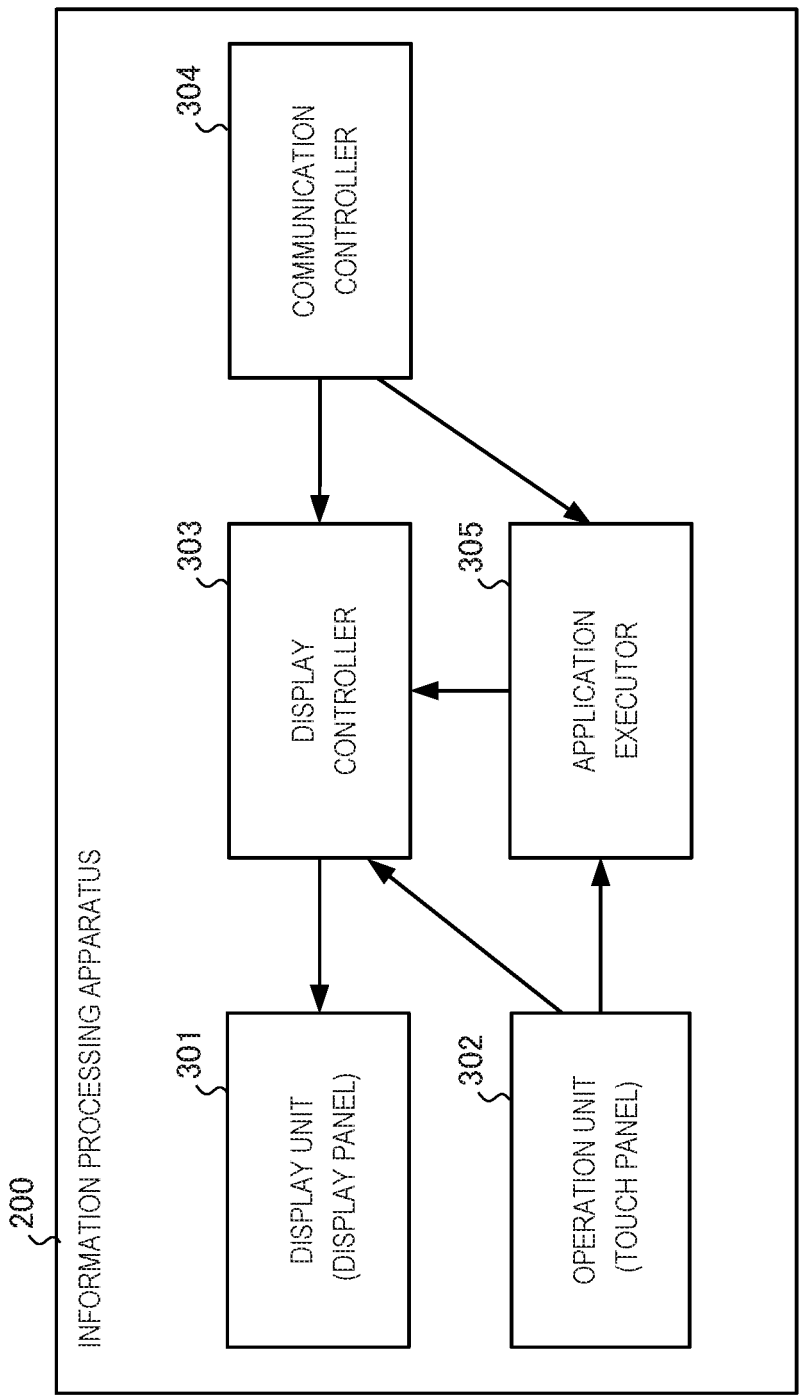
FIG. 3A is a block diagram for explaining the functional arrangement of the information processing apparatus according to the second embodiment of the present invention.

FIG. 3A is a block diagram showing the functional arrangement of the information processing apparatus 200. The information processing apparatus 200 includes a display panel as a display unit 301, a touch panel as an operation unit 302, a display controller 303, a communication controller 304, and an application executor 305.

The application executor 305 executes an application in response to a user operation on the operation unit 302. An application execution result is sent to the display controller 303.

The display controller 303 generates a display image in accordance with the application execution result. At this time, in accordance with settings (the upper limit of the display frame count and the like) input from the operation unit 302, the display controller 303 generates at least one display frame, and displays it so that it is possible to discriminate an active display frame from an inactive display frame.

For example, if the upper limit of the display frame count is set to one, the display controller 303 always performs full-screen display. If the upper limit of the display frame count is set to two, when one application is executed, full-screen display is performed. However, in a state in which two or more applications are executed, the execution results of two applications are arranged and displayed in two display frames. This allows the user to see the execution results of the plurality of applications at the same time. The display frame count may be settable to three or more, as a matter of course. Furthermore, the arrangement of the respective display frames may be freely settable. Alternatively, when the display frame count is determined, the positions of the respective display frames may be automatically determined.

A functional arrangement in which the number of display frames to be simultaneously displayed can be selected every time may be adopted. For example, in a state in which four applications are executed, one of the applications may be selected and undergo full-screen display or two of the applications may be selected and undergo 2-division display (the display frame count is two).

Under the control of the display controller 303, the display unit 301 arranges the display frames 211 and 212 side by side on the screen 210, and displays, in the display frames 211 and 212, pieces of information generated by the different applications.

Figure 3B:
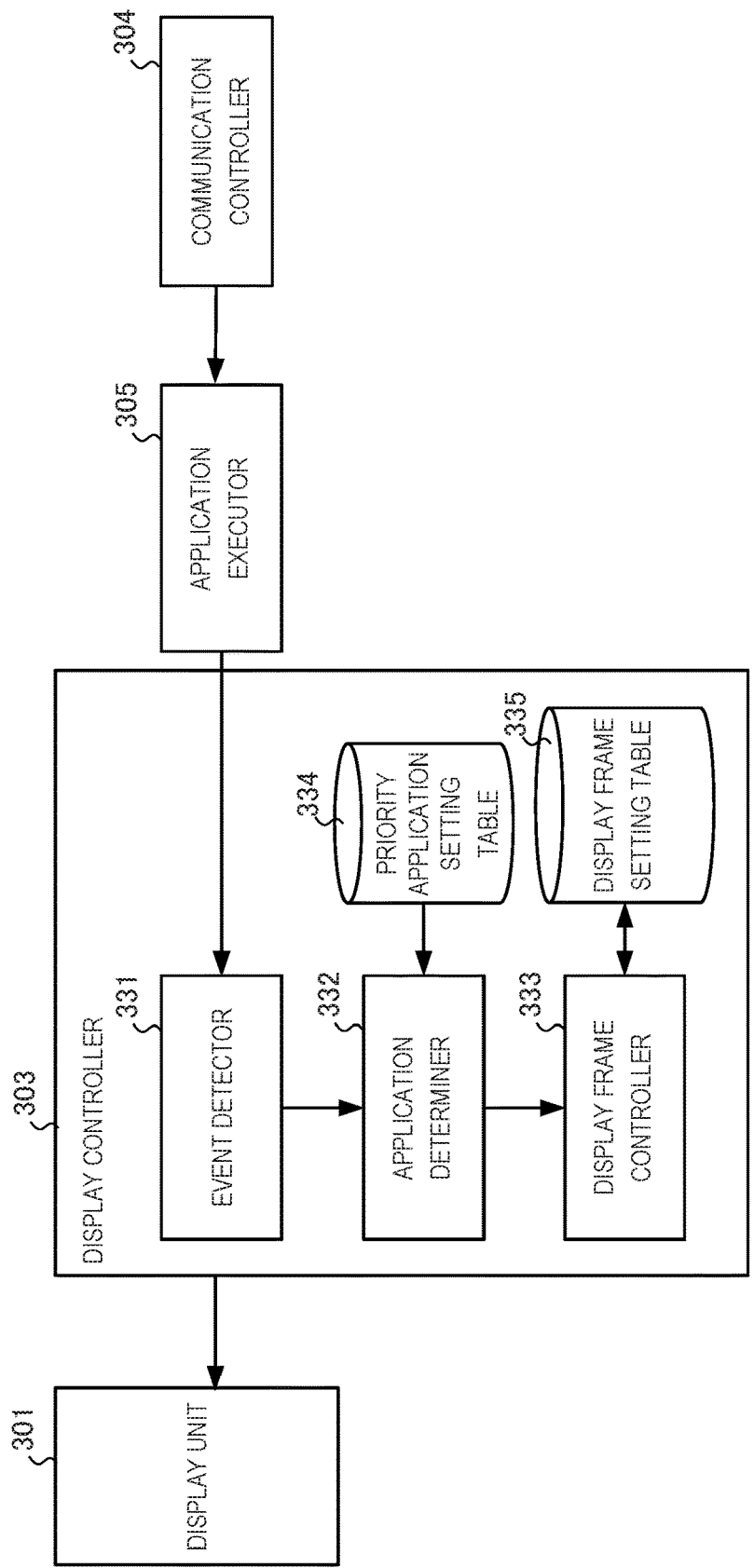
FIG. 3B is a block diagram for explaining the functional arrangement of the information processing apparatus according to the second embodiment of the present invention.

FIG. 3B is a block diagram showing the internal arrangement of the display controller 303. The display controller 303 includes an event detector 331, an application determiner 332, a display frame controller 333, a priority application setting table 334, and a display frame setting table 335.

Based on, for example, an incoming call notification sent from the communication controller 304 to the Internet voice communication application, the event detector 331 determines whether an incoming call event has occurred in the Internet voice communication application. If the incoming call event has occurred, the event detector 331 notifies the application determiner 332 of it. The application determiner 332 determines the relationship between the application in which the event such as an incoming call has occurred and an application (another application) simultaneously displayed with the application. A determination result is sent to the display frame controller 333. If the priority level of the other application is equal to or lower than that of the Internet voice communication application, the display frame controller 333 enlarges the display frame of the Internet voice communication application and reduces the display frame of the other application. Conversely, if the priority level of the other application is higher than that of the Internet voice communication application, the display frame controller 333 performs display without enlarging the display frame of the Internet voice communication application and changing the size of the display frame of the other application.

Figure 4:
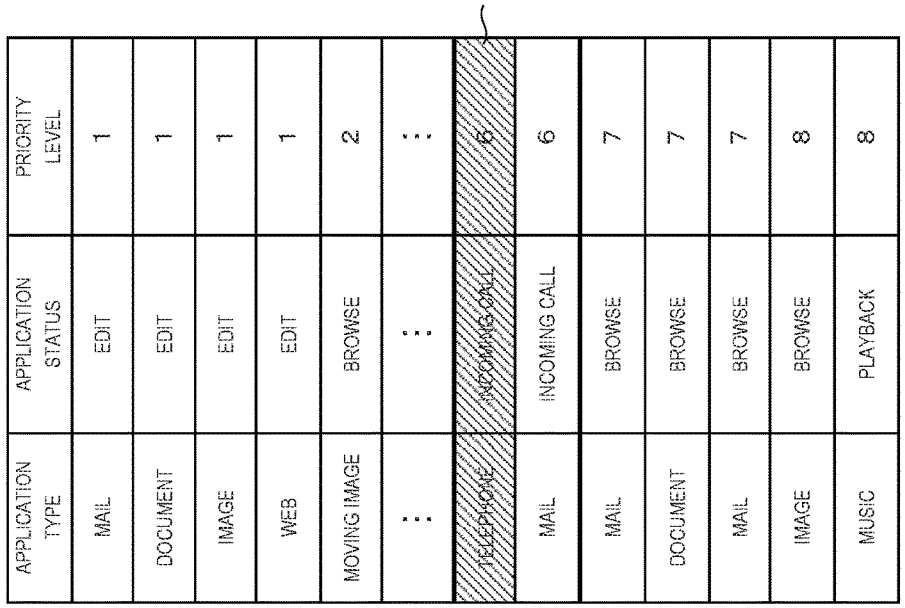
FIG. 4 is a table for explaining the structure of a table used by the information processing apparatus according to the second embodiment of the present invention.

The priority application setting table 334 sets a priority level to indicate an application to be preferentially displayed. The priority application setting table 334 has, for example, a structure shown in FIG. 4, in which priority levels are assigned to various statuses for each application type. The application determiner 332 determines whether each application status has a priority level higher than a priority level 401 of an incoming call of a telephone.

Figure 5:
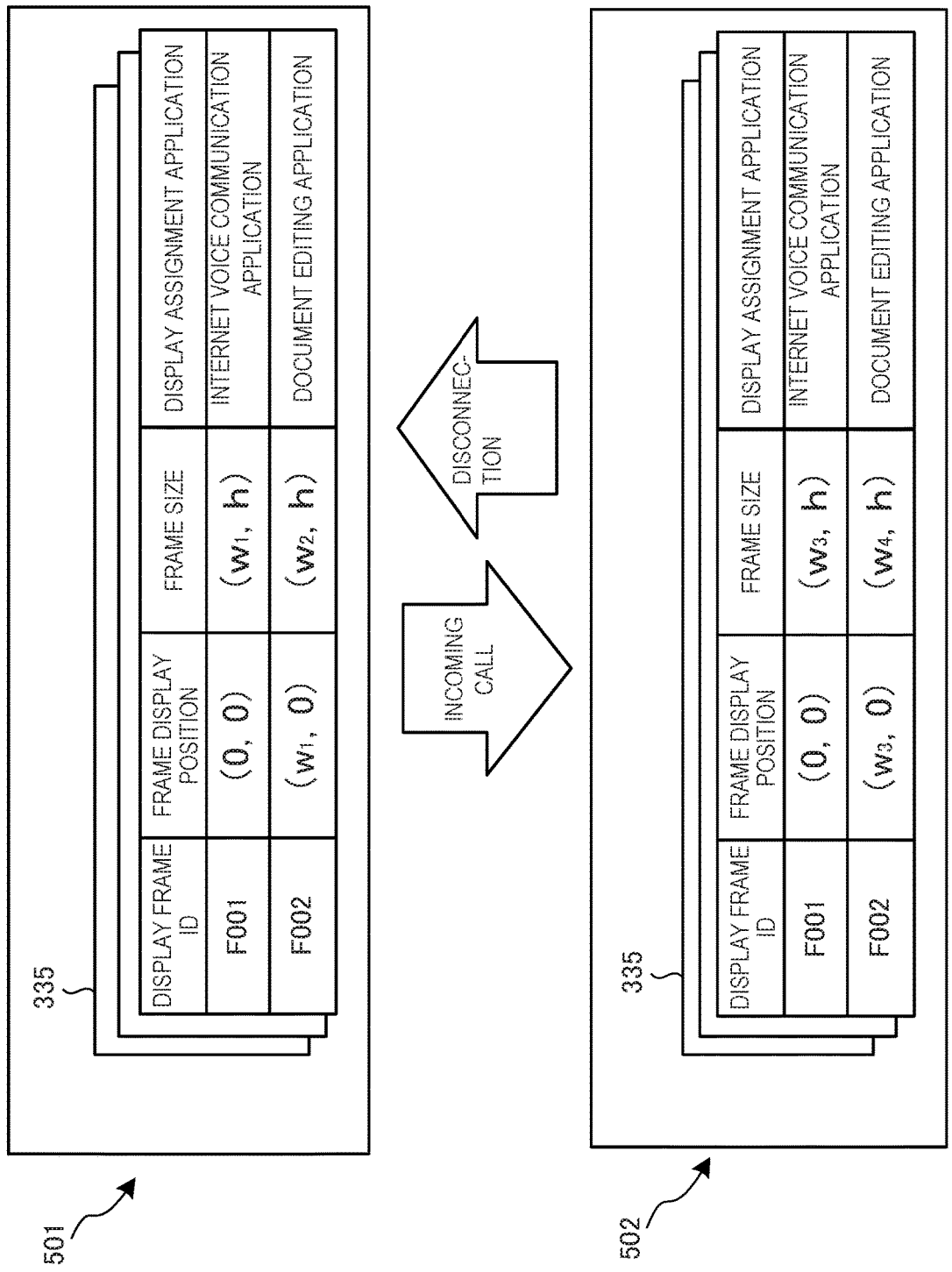
FIG. 5 is a view for explaining the structure of a table used by the information processing apparatus according to the second embodiment of the present invention.

The display frame setting table 335 has, for example, a structure shown in FIG. 5. The display frame setting table 335 shown in FIG. 5 is prepared for each display frame count, in which a display frame ID, a frame display position, a frame size, and a display assignment application are set. That is, in a state 501 on the upper side of FIG. 5, a display frame with an ID "F001" is displayed at a position of coordinates (0, 0) in a size (width, height)=(w1, h), and a display frame with an ID "F002" is displayed at a position of coordinates (w1, 0) in a size (width, height)=(W2, h). The Internet voice communication application is assigned to the display frame F001, and the document editing application is assigned to the display frame F002.

In this state, if an incoming call event occurs in the Internet voice communication application, the frame size of the frame F001 is changed to a size (w3, h), and the frame position and size of the frame F002 are changed to a position (w3, 0) and a size (w4, h).

These changes implement the change of the display shown in FIG. 2A.

If the display frame count is three, three display frame IDs "F001" to "F003" are set, and the table has three rows.

<<Hardware Arrangement of Information Processing Apparatus>>

Figure 6:
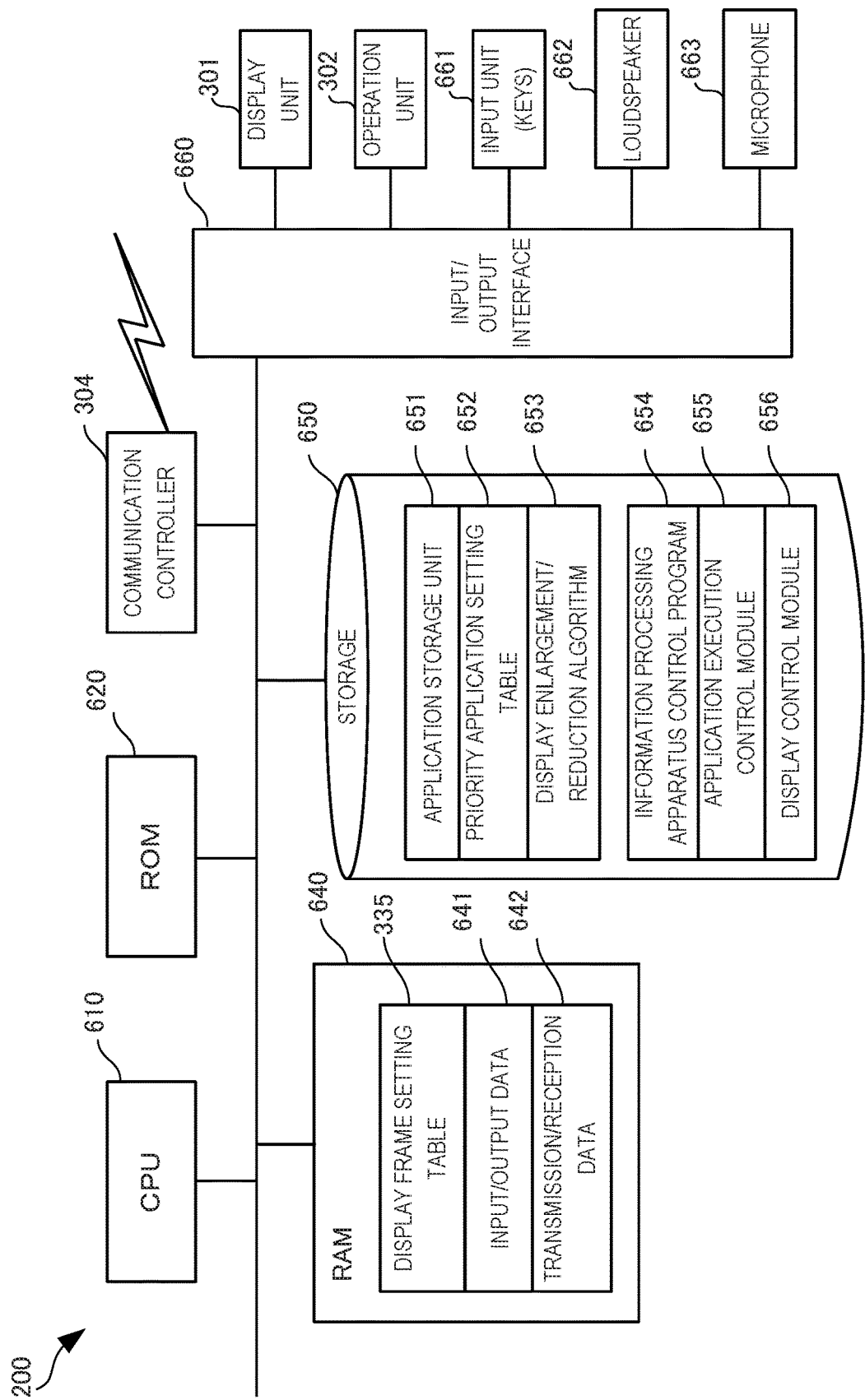
FIG. 6 is a block diagram for explaining the hardware arrangement of the information processing apparatus according to the second embodiment of the present invention.

FIG. 6 is a block diagram showing the hardware arrangement of the information processing apparatus 200 according to this embodiment.

Referring to FIG. 6, a CPU (Central Processing Unit) 610 is an arithmetic control processor, and implements the functional components of the information processing apparatus 200 shown in FIG. 3A by executing a program. A ROM (Read Only Memory) 620 stores permanent data such as initial data and a program, and programs. The communication controller 304 communicates with another apparatus via a network. Note that the number of CPUs 610 is not limited to one, and a plurality of CPUs or a GPU (Graphic Processing Unit) for image processing may be included. The communication controller 304 desirably includes a CPU independent of the CPU 610, and writes or reads out transmission/reception data in or from the area of a RAM (Random Access Memory) 640. It is desirable to provide a DMAC (Direct Memory Access Controller) (not shown) for transferring data between the RAM 640 and a storage 650. Furthermore, an input/output interface 660 desirably includes a CPU independent of the CPU 610, and writes or reads out input/output data in or from the area of the RAM 640. Therefore, the CPU 610 processes the data by recognizing that the data has been received by or transferred to the RAM 640. Furthermore, the CPU 610 prepares the processing results of various applications in the RAM 640, and delegates succeeding transmission or transfer to the communication controller 304, DMAC, or input/output interface 660.

The RAM 640 is a random access memory used as a temporary storage work area by the CPU 610. An area to store data necessary for implementation of the embodiment is allocated to the RAM 640. As an example, the display frame setting table 335, input/output data 641, and transmission/reception data 642 are temporarily stored in the RAM 640. The input/output data 641 are transfer data exchanged with the display unit 301 and the operation unit 302 via the input/output interface 660. The transmission/reception data 642 are data transmitted/received via the communication controller 304.

The storage 650 stores a database, various parameters, or the following data or programs necessary for implementation of the embodiment. An application storage unit 651 stores applications executable by the information processing apparatus 200. A display enlargement/reduction algorithm 653 stores a processing scheme of enlarging and reducing display data.

The storage 650 further stores the following programs. An information processing apparatus control program 654 is a basic program for controlling the overall information processing apparatus 200. An application execution control module 655 is a module for executing applications stored in the application storage unit 651. A display control module 656 is a module for performing display control according to the display frame setting table 330. More specifically, the display frame control module 656 controls the arrangement, on the display unit 301, of the display frames assigned with pieces of display information generated by executing the applications.

The input/output interface 660 interfaces input/output data with an input/output device. The input/output interface 660 is connected to the display unit 301, the operation unit 302, an input unit 661 with hardware keys, a loudspeaker 662, a microphone 663, and the like. Although not shown, the input/output interface 660 is connected to a GPS position determiner, an acceleration sensor, a geomagnetic sensor, and the like.

<<Processing Procedure of Information Processing Apparatus>>

Figure 7:
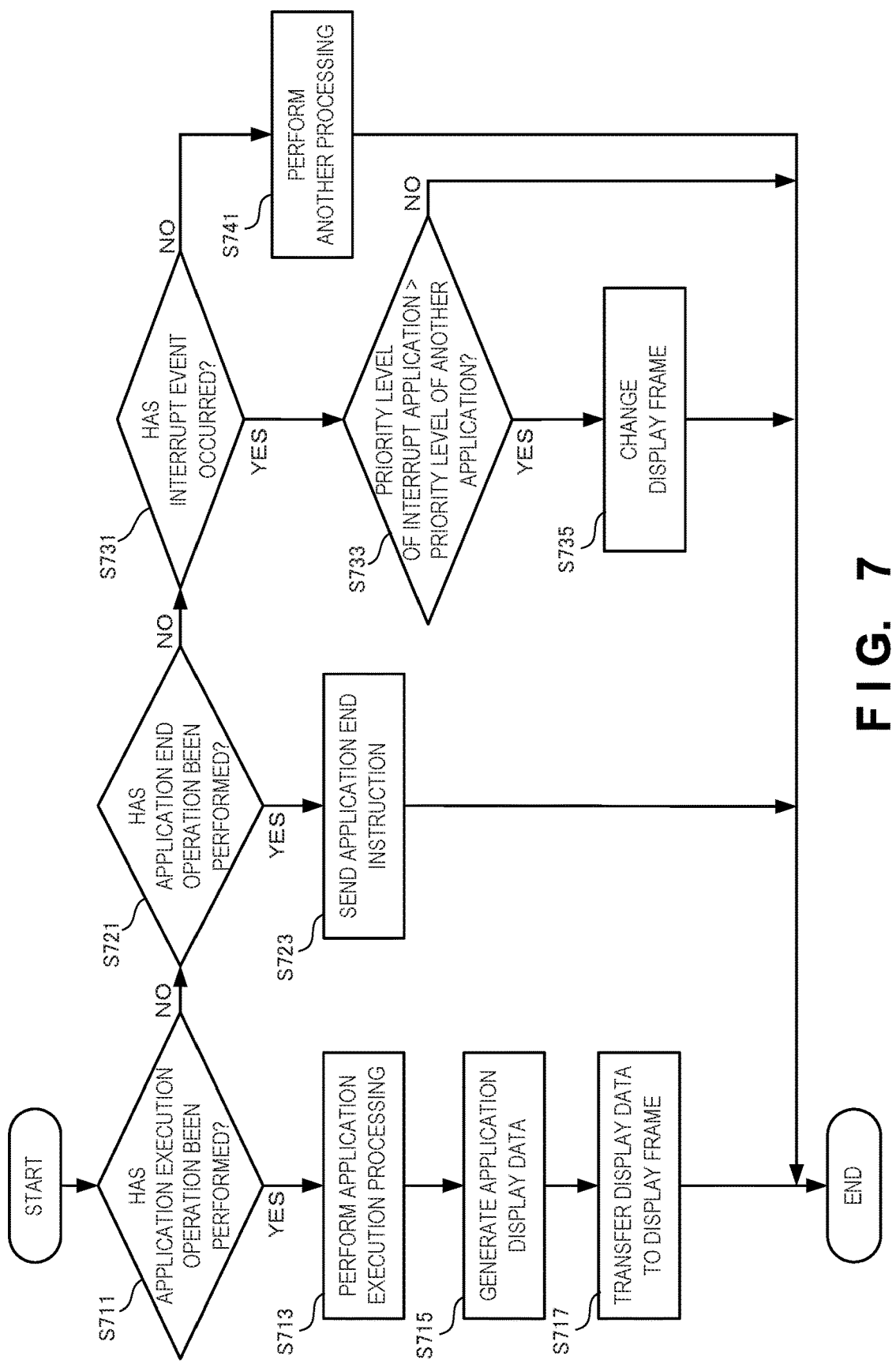
FIG. 7 is a flowchart for explaining the processing procedure of the information processing apparatus according to the second embodiment of the present invention.

FIG. 7 is a flowchart illustrating the processing procedure of the information processing apparatus 200 according to this embodiment. The respective processes of this flowchart are executed by the CPU 610 of FIG. 6 using the RAM 640, thereby implementing the functional components shown in FIG. 3A.

In step S711, the information processing apparatus 200 determines whether an application execution operation has been performed. If an application execution operation has been performed, the information processing apparatus 200 executes an instructed application in step S713. In step S715, the information processing apparatus 200 generates display data related to execution of the application. In step S717, the information processing apparatus 200 transfers the generated display data to display it in an assigned display frame.

If no application execution operation has been performed, the information processing apparatus 200 determines in step S721 whether an operation of ending the currently executed application has been performed. If the operation of ending the currently executed application has been performed, the information processing apparatus 200 ends the instructed application in step S723.

If neither an application execution operation nor an application end operation has been performed, the information processing apparatus 200 determines in step S731 whether an interrupt event which requires enlargement of the display frame has occurred in one of the applications. An example of the event is an incoming call event in the Internet voice communication application. The present invention, however, is not limited to this. For example, the event may be an incoming mail event, an incoming chat event, or a timer-reserved function execution event.

If an interrupt event which requires enlargement of the display frame has occurred, the information processing apparatus 200 determines in step S733 whether the priority level of the application in which the interrupt event has occurred is higher than that of the application corresponding to the other display frame.

In step S735, the information processing apparatus 200 performs processing of changing the size of the display frame.

If neither an application execution operation nor an application end operation has been performed, and no interrupt event has occurred, the information processing apparatus 200 performs, in step S741, another processing instructed and operated.

As described above, according to this embodiment, the user can immediately grasp acceptance of an event. On the other hand, during an important operation, the user can continue the operation without any problem.

Note that simultaneously with an incoming call, the width of the display frame 211 is largely changed in this example. The present invention, however, is not limited to this. For example, upon detecting a click on the incoming call icon 211*a* displayed by the Internet phone application, the size of the display frame 211 may be increased. Upon detecting the end of voice communication, the size of the display frame 211 may be returned to the original one.

Third Embodiment

Figure 8A:
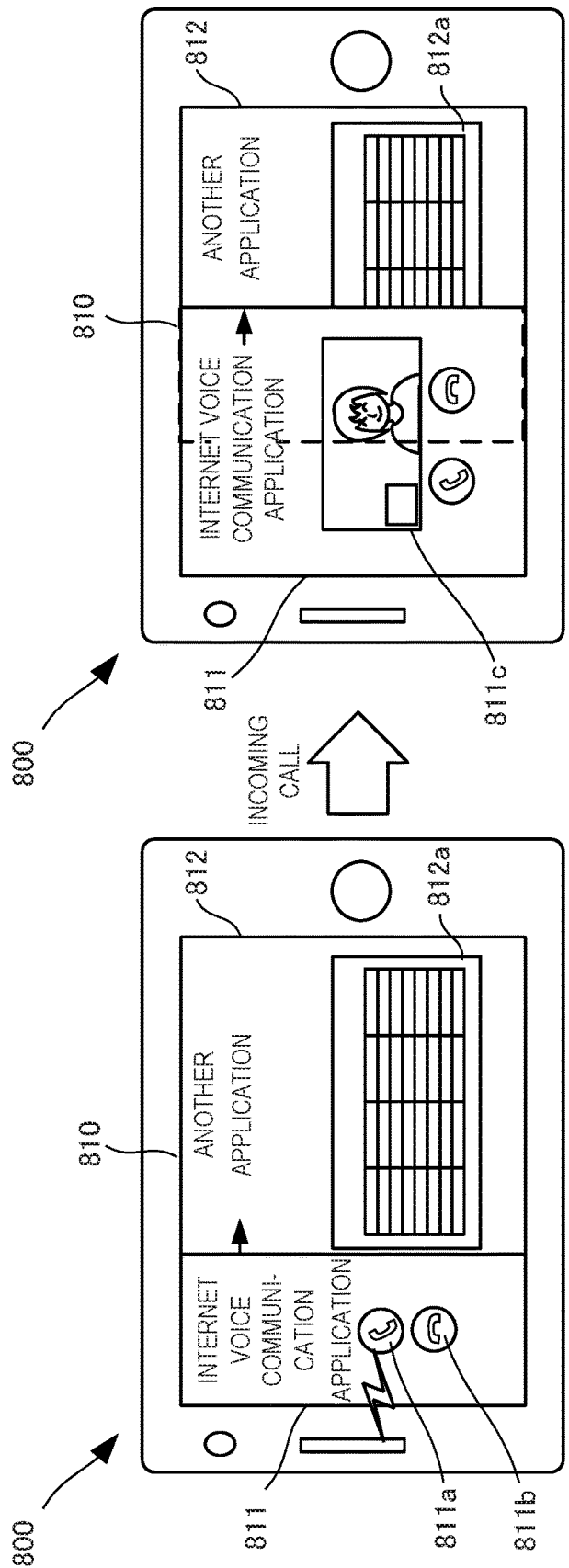
FIG. 8A is a view showing a display example by an information processing apparatus according to the third embodiment of the present invention.

An information processing apparatus 800 according to the third embodiment of the present invention will be described next with reference to FIGS. 8A, 8B, and 9. FIG. 8A is a view for explaining transition of the display screen of the information processing apparatus 800 according to this embodiment. The information processing apparatus 800 according to this embodiment is different from that according to the second embodiment in that display frames can be overlaid and displayed. The remaining components and operations are the same as those in the second embodiment. Hence, the same reference numerals denote the same components and operations, and a detailed description thereof will be omitted.

As shown in FIG. 8A, the information processing apparatus 800 can display display frames 811 and 812 side by side on a screen 810. Images generated by different applications can be simultaneously displayed in the display frames 811 and 812. As an example, icons 811*a* and 811*b* generated by an Internet voice communication application are displayed in the display frame 811. Furthermore, a table 812*a* generated by a spreadsheet application is displayed in the display frame 812.

In this state, if an event (for example, an incoming call) for the Internet voice communication application is externally accepted, the information processing apparatus 800 automatically changes the display size of the display frame 811. More specifically, the information processing apparatus 800 increases the width of the display frame 811 and displays it in front of the display frame 812. This eliminates the need to enlarge the display frame 811 by a manual operation after the incoming call, thereby making it possible to improve the usability of the Internet voice communication application.

Figure 8B:
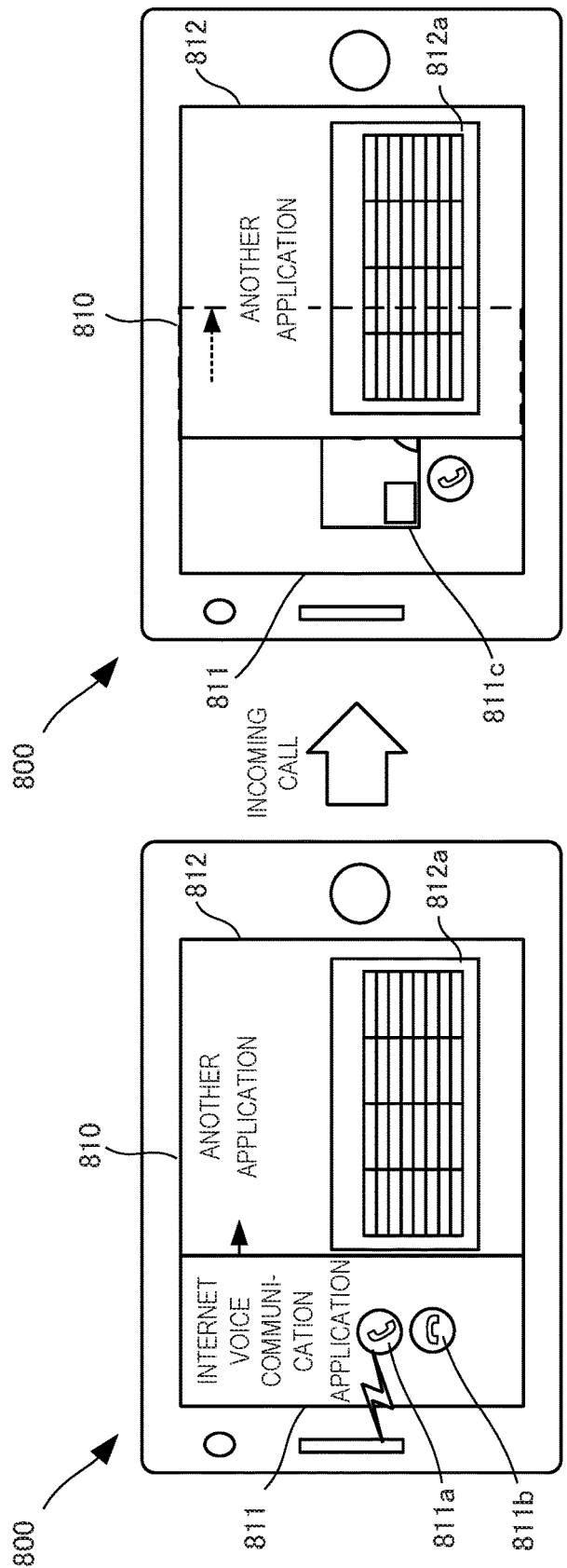
FIG. 8B is a view showing a display example by the information processing apparatus according to the third embodiment of the present invention.

On the other hand, as shown in FIG. 8B, if the Internet voice communication application and a document editing application are simultaneously displayed, it is determined to prioritize the document editing application over the Internet voice communication application, and the display frame 812 of the document editing application is displayed on the foreground. That is, even if an event such as an incoming call occurs, the display state of the display frame 812 remains unchanged. Although the display frame 811 is displayed in a larger size, an image after the incoming call is displayed behind the display frame 812.

As described above, even if an event such as an incoming call occurs, if the other application is more important, the display state of the other application remains unchanged. This can continue an operation such as a document editing operation without any problem.

Figure 9:
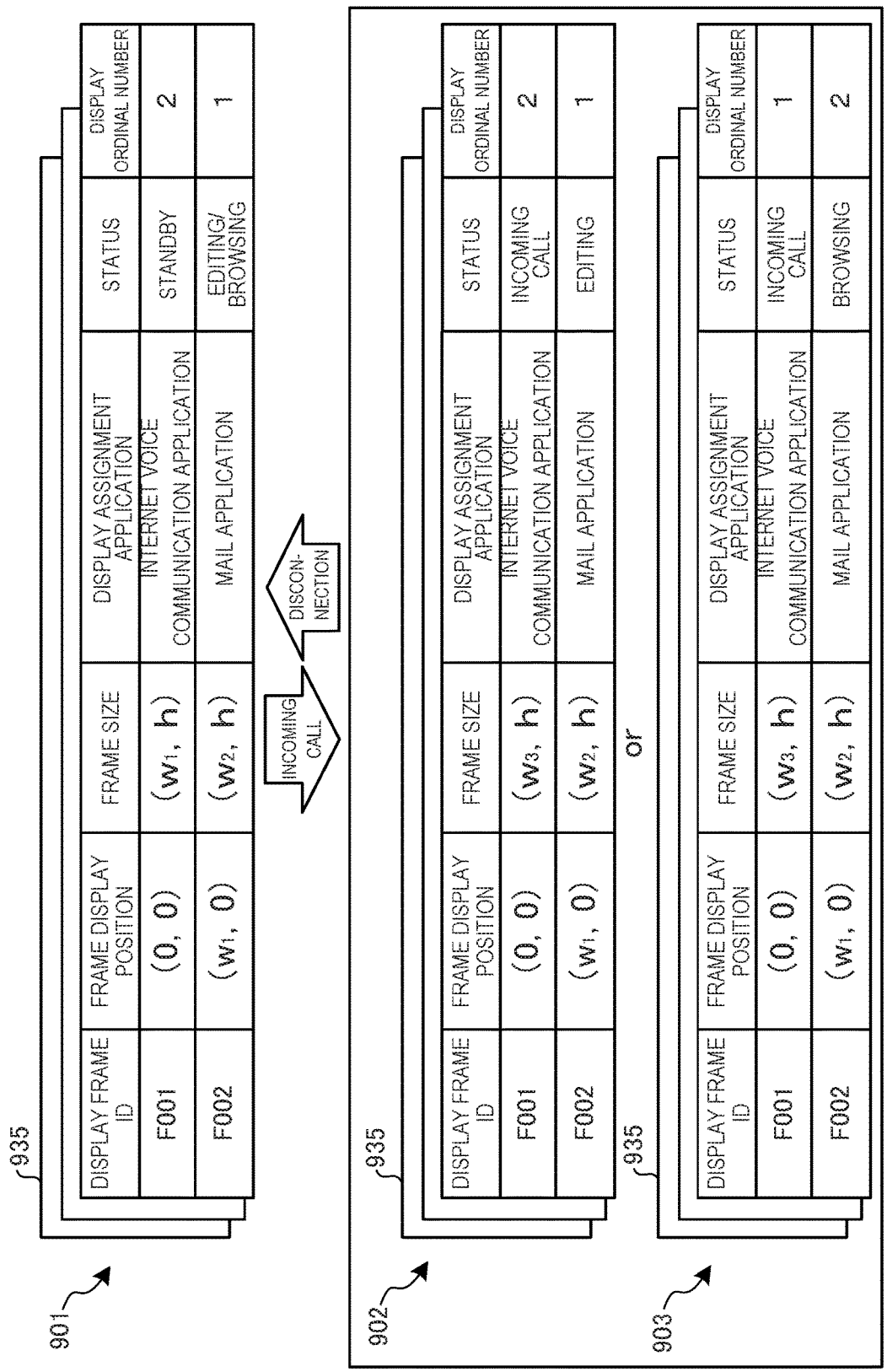
FIG. 9 is a view for explaining the structure of a table used by the information processing apparatus according to the third embodiment of the present invention.

In this embodiment, a display frame setting table 935 has, for example, a structure shown in FIG. 9. The display frame setting table 935 shown in FIG. 9 is prepared for each display frame count, in which a display frame ID, a frame display position, a frame size, a display assignment application, a status, and a display ordinal number are set. That is, in a state 901 on the upper side of FIG. 9, a display frame with an ID "F001" is displayed at a position of coordinates (0, 0) in a size (width, height)=(w1, h), and a display frame with an ID "F002" is displayed at a position of coordinates (w1, 0) in a size (W2, h). The Internet voice communication application is assigned to the display frame F001, and is in a standby state. A mail application is assigned to the display frame F002, and is in an editing state or browsing state.

At this time, with respect to the display ordinal numbers, since the priority level of the standby state of the Internet voice communication application is low, the display ordinal number of the mail application indicates the foreground (the value is 1), and the display ordinal number of the Internet voice communication application indicates the background (the value is 2). In this state, however, the display frames are not overlaid on each other, and thus the display ordinal numbers are insignificant.

In this state, if an incoming call for the Internet voice communication application is accepted, the size of the display frame F001 becomes large (W1→W3). At this time, if the mail application is in the editing state, its priority level is high, and thus the mail application is displayed on the foreground. The Internet voice communication application is displayed on the background although its size is larger (state 902).

On the other hand, if the mail application is in the browsing state, its priority level is low, and thus the mail application is displayed on the background. The Internet voice communication application is displayed on the foreground (state 903).

These changes implement the change of the display shown in FIGS. 8A and 8B. If the display frame count is three, three display frame IDs "F001" to "F003" are set, and the table has three rows.

As described above, according to this embodiment, the user can immediately grasp acceptance of an event. On the other hand, during an important operation, the user can continue the operation without any problem.

Figure 10:
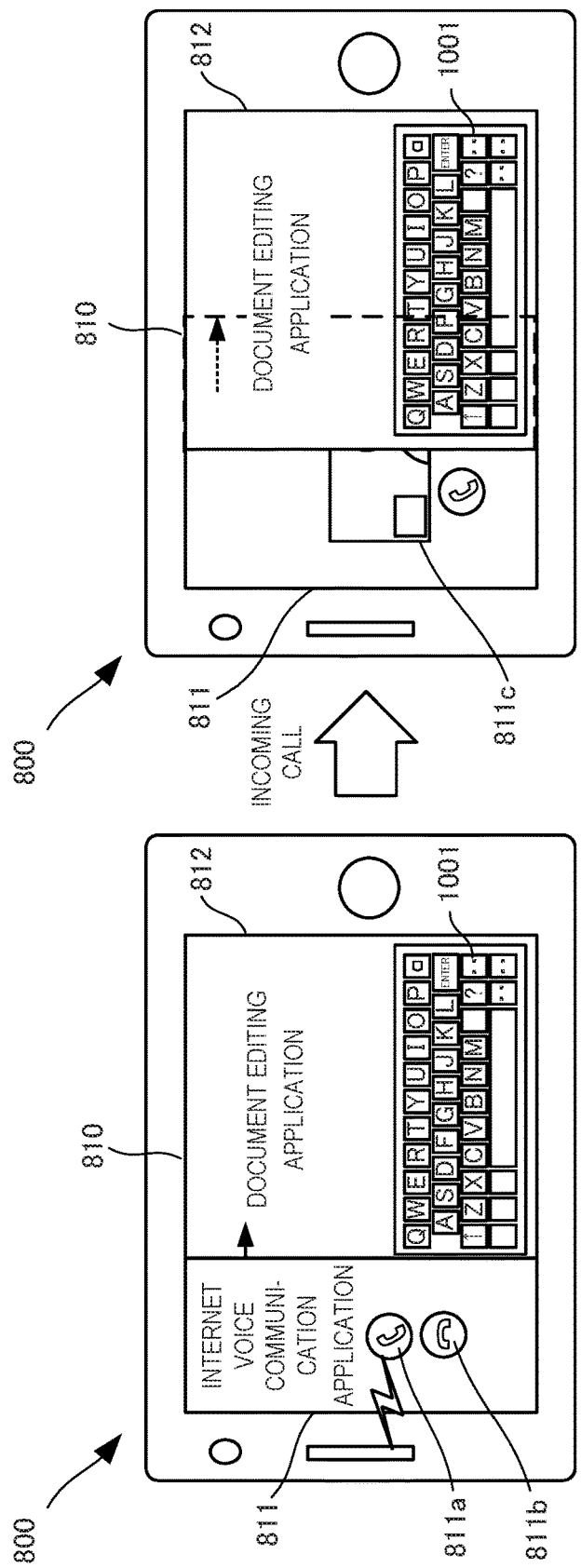
FIG. 10 is a view showing another display example by the information processing apparatus according to the third embodiment of the present invention.

Note that in this embodiment, the display ordinal numbers are changed depending on whether the document editing application is in the editing status. However, as shown in FIG. 10, the display and non-display states of a keyboard image may be considered as different statuses. That is, in a state in which the keyboard image is displayed, the display frame of the Internet voice communication application is displayed on the background. Conversely, even if the document editing application is currently executed, if no keyboard is displayed, the display frame of the Internet voice communication application is displayed on the foreground.

Figure 11:
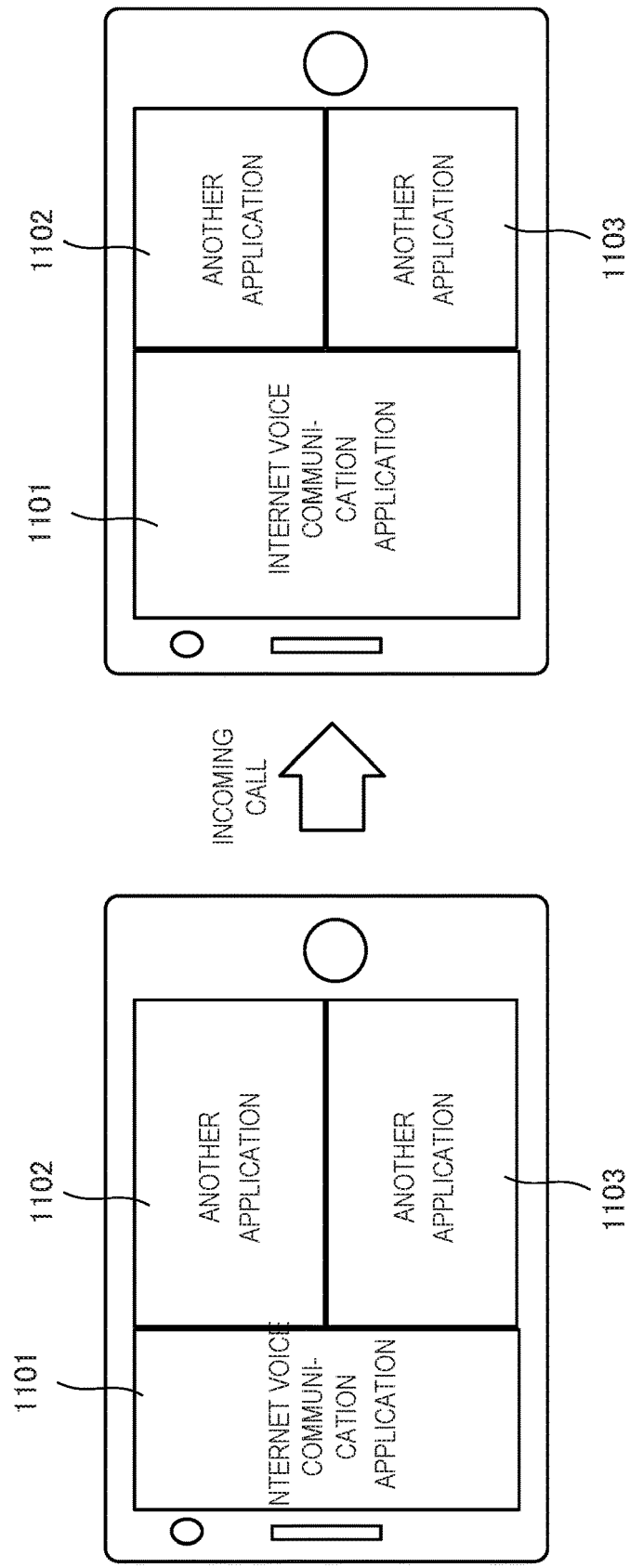
FIG. 11 is a view showing still other display example by the information processing apparatus according to the third embodiment of the present invention.

Furthermore, as shown in FIG. 11, even if three or more display frames are displayed, the size of a display frame 1101 in which the Internet voice communication application is displayed is automatically changed in response to occurrence of an event. Then, in accordance with the size of the Internet voice communication application, the sizes of display frames 1102 and 1103 of other applications are changed to smaller ones.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

This application claims the benefit of Japanese Patent Application No. 2014-188301 filed on Sep. 16, 2014, which is hereby incorporated by reference herein in its entirety.

The invention claimed is:

1. An information processing apparatus comprising:
a display unit that arranges a first display frame and a second display frame side by side on a screen, displays, in the first display frame, information generated by a first application, and displays, in the second display frame, information generated by a second application; and
a display controller that, when the first display frame and the second display frame are displayed side by side on the screen, automatically changes, if the first application is a voice communications application for accepting a call, at least one of a height and a width of the first display frame on accepting the call, automatically displays the first display frame in front of the second display frame for a mail application when in a browsing state, and automatically displays the second display frame in front of the first display frame for the mail application when in an editing state.

2. The information processing apparatus according to claim 1, wherein at the time of acceptance of the call, said display controller automatically changes the at least one of a height and a width of the first display frame to be larger than that before acceptance of the call, and automatically changes at least one of a height and a width a size of the second display frame to be smaller than that before acceptance of the event.

3. The information processing apparatus according to claim 1, wherein if the second application is a predetermined application, said display controller does not change the at least one of the height and the width of the second display frame on accepting the call.

4. The information processing apparatus according to claim 1, wherein if the second application currently performs a predetermined operation, said display controller does not change at least one of a height and a width of the second display frame on accepting the call.

5. The information processing apparatus according to claim 1, wherein the voice communication application for accepting the call is capable of performing transmission/reception of one of mail and a message.

6. A control method of an information processing apparatus including a display unit that arranges a first display frame and a second display frame side by side on a screen, displays, in the first display frame, information generated by a first application, and displays, in the second display frame, information generated by a second application, the method comprising:
when the first display frame and the second display frame are displayed side by side on the screen, automatically changing, if the first application is a voice communication application for accepting a call, at least one of a height and a width of the first display frame on accepting the call, automatically displaying the first display frame in front of the second display frame for a mail application when in a browsing state, and automatically displaying the second display frame in front of the first display frame for the mail application when in an editing state.

7. A non-transitory computer readable medium storing a control program of an information processing apparatus including a display unit that arranges a first display frame and a second display frame side by side on a screen, displays, in the first display frame, information generated by a first application, and displays, in the second display frame, information generated by a second application, for causing a computer to execute a method, comprising:
when the first display frame and the second display frame are displayed side by side on the screen, automatically changing, if the first application is a voice communication application for accepting a call, at least one of a height and a width of the first display frame on accepting the call, automatically displaying the first display frame in front of the second display frame for a mail application when in a browsing state, and automatically displaying the second display frame in front of the first display frame for the mail application when in an editing state.

\* \* \* \* \*